United States Patent
Bouthors et al.

[15] 3,690,192
[45] Sept. 12, 1972

[54] TRANSMISSION MECHANISMS FOR AUTOMOBILES AND OTHER VEHICLES

[72] Inventors: Pierre Bouthors; Philippe Quemerais, both of Billancourt, France

[73] Assignees: Regie Nationale des Usines Renault, Billancourt; Automobiles Peugeot, Paris, France

[22] Filed: Oct. 6, 1970

[21] Appl. No.: 78,506

[30] Foreign Application Priority Data

Oct. 29, 1969 France..................6936037

[52] U.S. Cl.................................................74/199
[51] Int. Cl............................................F16h 15/08
[58] Field of Search..................74/199, 360, 325

[56] References Cited

UNITED STATES PATENTS 3,557,636 1/1971 Dangauthier................74/199
3,387,507 6/1968 DeCoye de Castelet.74/199 X
3,530,732 9/1970 Kashihara....................74/199

*Primary Examiner*—Leonard H. Gerin
*Attorney*—Stevens, Davis, Miller & Mosher

[57] ABSTRACT

A transmission mechanism for automotive vehicles or other machines, which comprises a drive shaft, a friction-type, single-stage variable-speed system comprising internally tangent male and female disks adapted to be clamped together by means of a fluid-actuated piston, wherein at least one driving male disk rigid with the input shaft of the variable-speed system is interposed between female disks rotatably solid with a drum adapted to rotate about the axis of said male and female disks, a disk clutch adapted to be engaged by the action of a plate, dog means permitting the change from forward motion to reverse motion of the vehicle, said transmission mechanism being characterized in that the piston for clamping the variable-speed disks is axially movable within the bore of said drum carrying the clutch disks and the driven disks of said variable-speed system, and that said drum is axially movable in relation to said clutch disk clamping plate.

6 Claims, 3 Drawing Figures

TRANSMISSION MECHANISMS FOR AUTOMOBILES AND OTHER VEHICLES

The present invention relates to transmission mechanisms for automobiles and other vehicles, and more particularly to a change-speed transmission mechanism comprising a clutch and a friction-type variable-speed system utilizing internally tangent male and female tapered disks.

Transmission mechanisms for vehicles are already known which comprise a hydrokinetic torque converter mounted in series with a variable-speed device utilizing internally tangent male and female disks. However, the efficiency of these known constructions is relatively poor due to the loss of power in the converter, which constitutes a far from negligible percentage of the engine output, even when the converter is operated as a coupling device, since the torque capacity and characteristic curve of the converter are set once for all by its inherent technology.

Transmission mechanisms are also known which comprise a two-stage variable-speed system. Now these arrangements are objectionable on account not only of the considerable number of movable component elements but also of the necessity of providing a different regulation of the axial stresses obtaining in the two stages. Another inconvenience characterizing these mechanisms is due to their considerable over-all dimensions for the two speed-variation stages must be aligned on a common axis if it is desired to simplify the gear reduction by shifting the driven shaft of the first stage (constituting the driving shaft of the second stage) while providing the direct-drive feature.

Other transmission mechanisms comprising variable-speed systems are known wherein a single driving disk is mounted to the crankshaft end and provided with a friction surface engaging a corresponding surface of a driven disk. In mechanisms of this character the axial stresses necessary for transmitting the torque are absorbed by the crankshaft bearings and therefore these bearings must be dimensioned accordingly. On the other hand, the use of a single friction surface reduces considerably the torque transmittable therethrough.

It is the essential object of the present invention to provide a transmission mechanism free of the inconveniences set forth hereinabove, which permits nevertheless a speed variation through a relatively wide range of reduction ratios while using a single-stage variable speed system of relatively reduced over-all dimensions.

It is another object of this invention to use in conjunction with the variable-speed system a friction clutch permitting of dissipating the energy corresponding to a start and providing a slipless drive of the vehicle or machine under normal driving conditions.

It is another object of the present invention to provide a device permitting when the vehicle is still, to change from forward to reverse operation and vice versa, in spite of a residual rotation of the driving shaft.

According to the present invention, the transmission mechanism comprising a input driving or power shaft, a single-stage, friction-type variable speed system incorporating internally tangent male and female disks adapted to be brought into mutual driving engagement by a fluid-actuated piston, wherein at least one male driving disk solid with said input shaft of the variable speed system is interposed between female disks rotatably solid with a drum adapted to rotate about the axis of an intermediate or lay shaft in a plane at right angles to the axis of said male and female disks, a disk clutch controlled by a fluid-actuated plate, dog means permitting the passage from forward operation to reverse operation of the vehicle, is characterized in that said fluid-actuated piston causing the mutual driving engagement of said disks in said variable-speed system is axially movable in the bore of said drum carrying said clutch disks and the driven disks of said variable speed system, and that said drum can move axially in relation to the clutch disk clamping plate.

With this transmission mechanism the space available is utilized under the best possible conditions.

The fact that the clutch can be released at the level of the variable speed system located at the crankshaft end affords, when the vehicle is still, a substantial reduction in the vis inertia of moving parts and thus facilitates the starting of the engine from cold and the change, when stopped, from forward operation to reverse operation of the vehicle, even when the vehicle engine is running.

Other features and advantages characterizing the present invention will appear from the following description of a typical and exemplary form of embodiment of the transmission mechanism of this invention given with reference to the attached drawing, in which.

Figure 1:
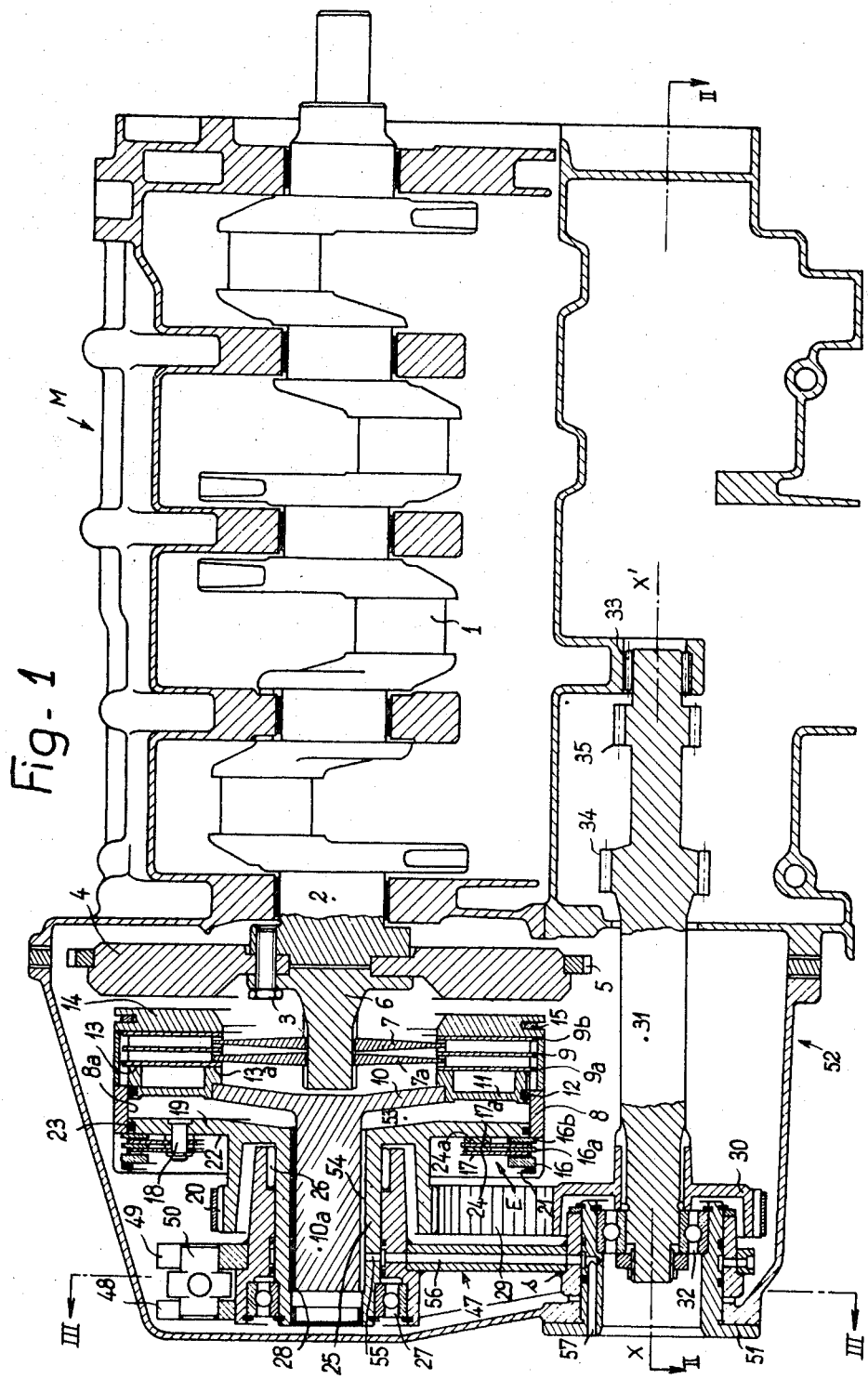
FIG. 1 is a fragmentary longitudinal and diagrammatical axial section showing the mechanism.

Referring first of FIG. 1, the mechanism illustrated comprises a thermal engine designated generally by the reference letter M and provided with a crankshaft 1 having secured to its output end 2, by means of screws 3, a flywheel 4 provided on its outer periphery with a starter ring gear 5 adapted to be engaged by the driving pinion of the starter motor (not shown). Said crankshaft end 2 also carries a splined stub shaft 6 secured by means of the same screws 3 and constituting the input shaft of the variable speed device.

Male driving disks 7, 7a mounted on said splined stub shaft 6 and housed within a drum 8 are disposed between driven disks 9, 9a and 9b rotatably solid through external teeth with the drum 8.

A piston 10 is rigid with a hollowed ring 11 provided with a seal 12 and axially movable within the bore 8a of drum 8. The outer and inner peripheries of this ring 11 engage with their front concentric faces 13, 13a the driven disk 9a. The piston 10 constitutes in conjunction with ring 11 a clamping plate which, during the operation of the mechanism, is adapted to clamp the driven disks 9, 9a, 9b and the driving disks 7, 7a between said ring 11 and an end cover 14 of drum 8 which is secured to one end of said drum by means of a circlip 15.

The end of drum 8 opposite to cover 14 carries the driving disks stacking of a clutch the engagement of which is controlled by hydraulic means, said clutch being designated in general by the reference letter E.

The clutch E consists of driving disks 16, 16a, 16b rotatably rigid with drum 8, and of driven disks 17, 17a. These driven disks are rotatably solid through a plurality of pins 18 with a plate 19 supporting a pinion 20. The driving disks 16, 16a and 16b are clamped between a resilient ring or circlip 21 and the face 22 of clamping plate 19 which is provided on its outer periphery with a seal packing 23.

Resilient rings 24, 24a are interposed between the driven disks 17, and 17a, and between the face 22 of plate 19, on the one hand, and the disk 17a, on the other hand, for a purpose to be described presently.

A tubular extension 25 of clamping plate 19 is journalled in bearings 26 and 27, but the plate cannot move axially, Slidably mounted in a ring 28 rigid with said tubular extension 25 of plate 19 is the rod 10a of piston 10.

Figure 2:
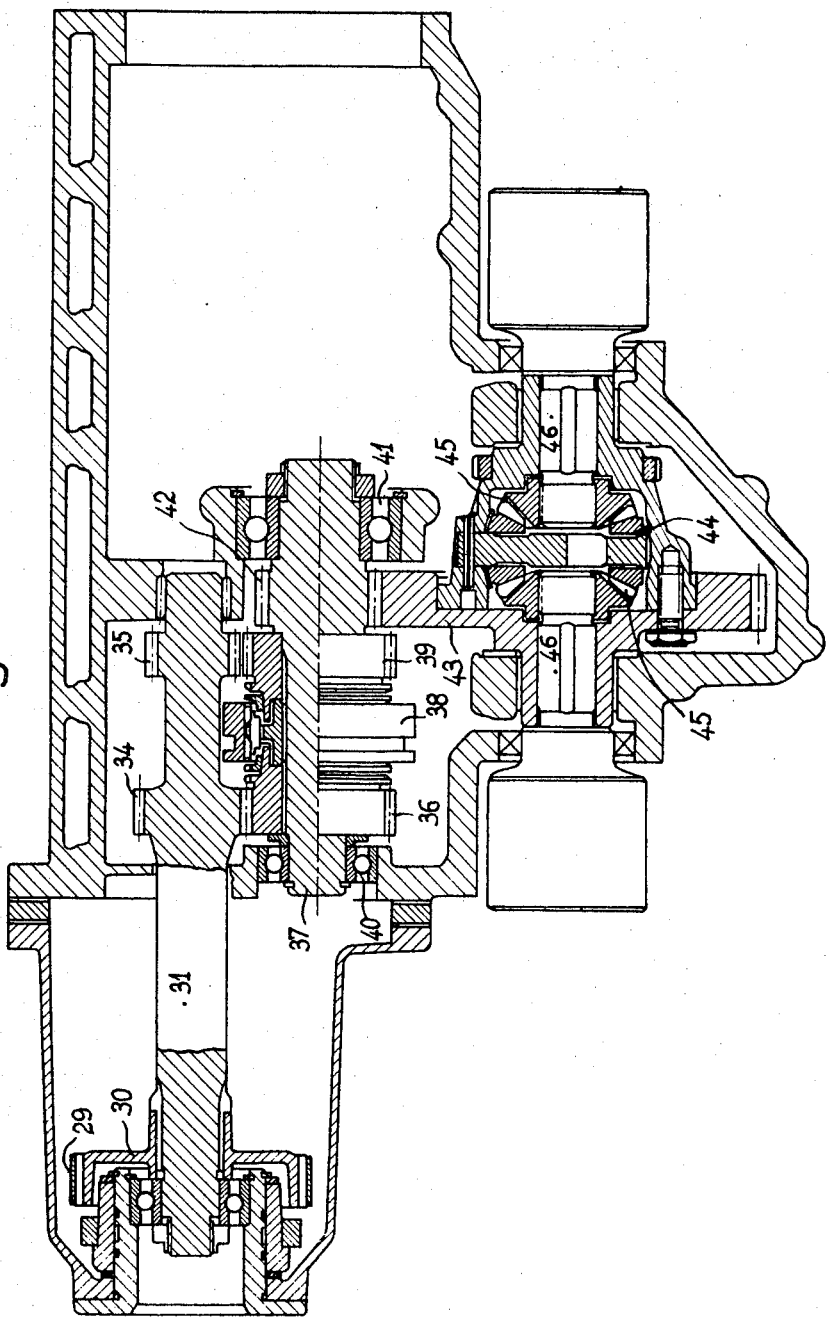
FIG. 2 is a section taken along the line II—II of FIG. 1.

The pinion 20 drives through a chain 29 and a pinion 30 rigid with a lay shaft 31 journalled in bearings 32, 33. One portion of this shaft has cut therein forward and reverse pinions 34, 35 respectively. These pinions 34, 35 are in constant meshing engagement the former with an idle pinion 26 carried by a stub shaft 37 and the latter with a reversing gear (not shown) (FIG. 2).

A synchromesh and dog-clutch device designated in general by the reference numeral 38 permits of drivingly connecting the stub shaft 37 of either with idle pinion 36 or with a pinion 39 in constant meshing engagement with the aforesaid reversing gear (not shown).

The shaft 37 is journalled in bearings 40, 41 and is formed with teeth 42 meshing with the crown wheel 43 of a differential designated in general by the reference numeral 44 and comprising planet gears 45 adapted to drive the two axle shafts 46 leading to the driving road wheels of the vehicle.

The bearings 27 and 26 are mounted in a movable structure shown generally at 47 and comprising a number of members rigidly assembled by "s" weldings.

Figure 3:
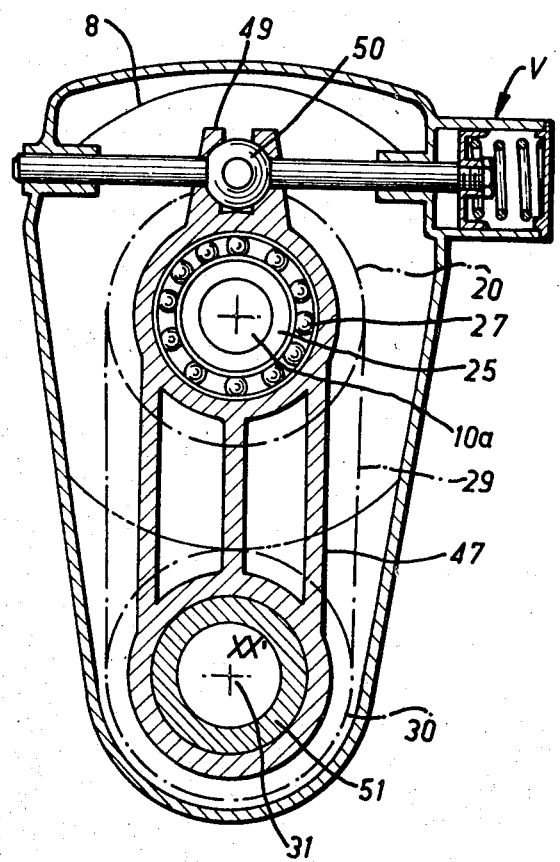
FIG. 3 is a section taken along line III—III of FIG. 1.

This movable structure 47 carries at its end a pair of welded and drilled lugs or tenons 48, 49 adapted to receive through the medium of trunnion means 50 the force exerted by a hydraulic cylinder and piston actuator as shown in FIG. 3, adapted to move this structure 47 angularly about the axis $x-x'$ of the lay shaft 31, in order to move the plate 19 and its pinion 20 to an eccentric position in relation to the stub shaft 6 and thus cause the desired speed variation of the transmission.

The movable structure 47 is trunnioned to this end on a sleeve 51 mounted in the case 52 of the mechanism.

The piston 10 and plate 19 clamping the former the disks of the variable-speed system and the latter the clutch disks constitute in the drum 8 a fluid-filled chamber 53 communicating with a source of fluid under pressure (not shown) via a slot 54 formed in the ring 28 and also through ducts 55, 56, 57 formed in the structure 47 and sleeve 51, as shown diagrammatically in FIG. 1.

The vehicle may be started from rest by gradually increasing the fluid pressure in chamber 53, thus moving the piston 10 and pressing the driving disks 7, 7a between the driven disks 9, 9a, 9b of the variable-speed system and at the same time, due to the axial movement of the drum 8 connected to the driven disks, thus gradually increasing the pressure of the driving disks 16, 16a, 16b against the driven disks 17, 17a of the clutch and against the face 22 of plate 19. The kinematic chain of the movement follows the path: crank shaft 1, shaft 6, variable speed system 7, 9, 8, clutch system 16, 17, 19, 20, 29, 30, 31, 34, 36, 38, 37, 42, 43, 44, 46, in forward drive, and the path 1, 6, 7, 9, 8, 16, 17, 19, pinions and chains 20, 29, 30, shafts and gears 31, 35, reversing gear (not shown), 39, 38, 37, 42, 43, 44, 46, in reverse.

It will be seen that the annular members 24, 24a normally tending to move the disks 17 and 17a away from each other, and disk 17a away from the face 22 of plate 19, afford a relative slippage under starting conditions of the vehicle at the level of the clutch disks. This effect is particularly advantageous for it permits of dissipating between the relatively large surface areas of the clutch disks the energy produced by the frictional contact during the slipping phase of the starting procedure.

While a single form of embodiment of the invention has been described hereinabove and shown in diagrammatic form in the attached drawing, it will be readily understood by those conversant in the art that various modifications and changes may be brought thereto without departing from the spirit and scope of the invention as set forth in the appended claims.

What is claimed as new is:

1. A transmission mechanism for automotive vehicles or other machines, which comprises a drive shaft, a friction-type, single-stage variable-speed system comprising internally tangent male and female disks adapted to be clamped together by means of a fluid-actuated piston, wherein at least one driving male disk rigid with the input shaft of the variable-speed system is interposed between female disks rotatably solid with a drum adapted to rotate about the axis of an intermediate shaft in a plane at right angles to the axis of said male and female disks, a disk clutch adapted to be engaged by the action of a plate, dog means permitting the change from forward motion to reverse motion of the vehicle, said transmission mechanism being characterized in that the piston for clamping the variable-speed disks is axially movable within the bore of said drum carrying the clutch disks and the driven disks of said variable-speed system, and that said drum is axially movable in relation to said clutch disk clamping plate.

2. Transmission mechanism according to claim 1, characterized in that said piston and plate intended for clamping the disks of said variable-speed system and of said clutch respectively form within said drum a chamber adapted to receive fluid under pressure.

3. Transmission mechanism according to claim 2 characterized in that resilient members are disposed between the driven disks of said clutch to permit the slipping and dissipation of the energy developped by friction when starting the vehicle from rest.

4. A transmission mechanism comprising:
   a friction-type, single-stage, variable-speed apparatus comprising internally tangent male and female disks, fluid-actuated piston means for clamping said disks together, and an input shaft to which at least one of said male disks, which is a drive disk, is rigidly attached,
   a drive shaft connected to the input shaft of the variable-speed apparatus,
   an intermediate shaft and a drum adapted to rotate thereabout, said drum having said female disks rotatably solid therewith, said driving male disk interposed between two of said female disks, and said drum adapted to rotate about the axis of said intermediate shaft in a plane at right angles to the axis of said male and female disks, a disk clutch substantially coaxial with said drum, and adapted to be engaged by the action of a clutch clamping plate, wherein said drum carries clutch disk and the driven disks of said variable-speed apparatus, and wherein said drum is axially movable in relation to the clutch clamping plate, and dog means for changing the output from said clutch from a forward motion to a reverse motion.

5. The transmission mechanism according to claim 1, wherein said piston and said clutch clamping plate for clamping the disks of said variable-speed system and of said clutch, form a chamber adapted to receive fluid under pressure within said drum.

6. The transmission mechanism according to claim 5, wherein resilient sealing members are disposed between the driven disks of said clutch for permitting slipping and dissipation of energy developed by friction when starting said mechanism.

* * * * *

UNITED STATES PATENT OFFICE
CERTIFICATE OF CORRECTION

Patent No. 3690192          Dated September 12, 1972

Inventor(s)     Pierre BOUTHORS et al

It is certified that error appears in the above-identified patent and that said Letters Patent are hereby corrected as shown below:

The Letters Patent should show the priority date for French application 69/36.037 as October 21, 1969 and NOT October 29, 1969.

Signed and sealed this 23rd day of January 1973.

(SEAL)
Attest:

EDWARD M. FLETCHER, JR.        ROBERT GOTTSCHALK
Attesting Officer               Commissioner of Patents